(12) United States Patent
St. Amant et al.

(10) Patent No.: US 7,740,816 B1
(45) Date of Patent: *Jun. 22, 2010

(54) METHOD FOR TREATING GASES TO BE SCRUBBED

(75) Inventors: Jefferey St. Amant, League City, TX (US); Kenneth R. Matheson, Corpus Christi, TX (US)

(73) Assignee: Vapor Point, LLC, LaPorte, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/365,582

(22) Filed: Feb. 4, 2009

Related U.S. Application Data

(60) Provisional application No. 61/063,901, filed on Feb. 6, 2008, provisional application No. 61/065,720, filed on Feb. 14, 2008.

(51) Int. Cl.
*B01D 53/34* (2006.01)

(52) U.S. Cl. .............. 423/210; 423/220; 423/226; 423/228; 423/238; 423/242.1; 423/242.2; 423/245.2; 96/4; 96/5; 95/45

(58) Field of Classification Search .............. 423/210, 423/220, 226, 228, 238, 242.1, 242.2, 245.2; 96/4, 5; 95/45
See application file for complete search history.

(56) References Cited

U.S. PATENT DOCUMENTS

| | | | |
|---|---|---|---|
| 4,973,435 A * | 11/1990 | Jain et al. | 264/29.6 |
| 5,122,165 A | 6/1992 | Wang et al. | |
| 5,698,011 A * | 12/1997 | Chung et al. | 95/45 |
| 6,592,782 B2 * | 7/2003 | MacKay et al. | 252/500 |
| 7,147,689 B1 | 12/2006 | Miller | |

* cited by examiner

*Primary Examiner*—Timothy C Vanoy
(74) *Attorney, Agent, or Firm*—Buskop Law Group, PC; Wendy Buskop

(57) ABSTRACT

A method for treating gases to be scrubbed, comprising filling a scrubber with a volume of lean liquid adequate to cover a sintered permeable membrane in the reaction chamber and a bit more to create a reaction zone in not only a plurality of pores in the membrane with gases but in a reaction zone above the membrane, then introducing gases to be scrubbed to the membrane, building up pressure in the reaction chamber, and passing scrubbed gas from the reaction zone to an exit port at a rate equal to the rate of gases to be scrubbed are introduced.

8 Claims, 8 Drawing Sheets

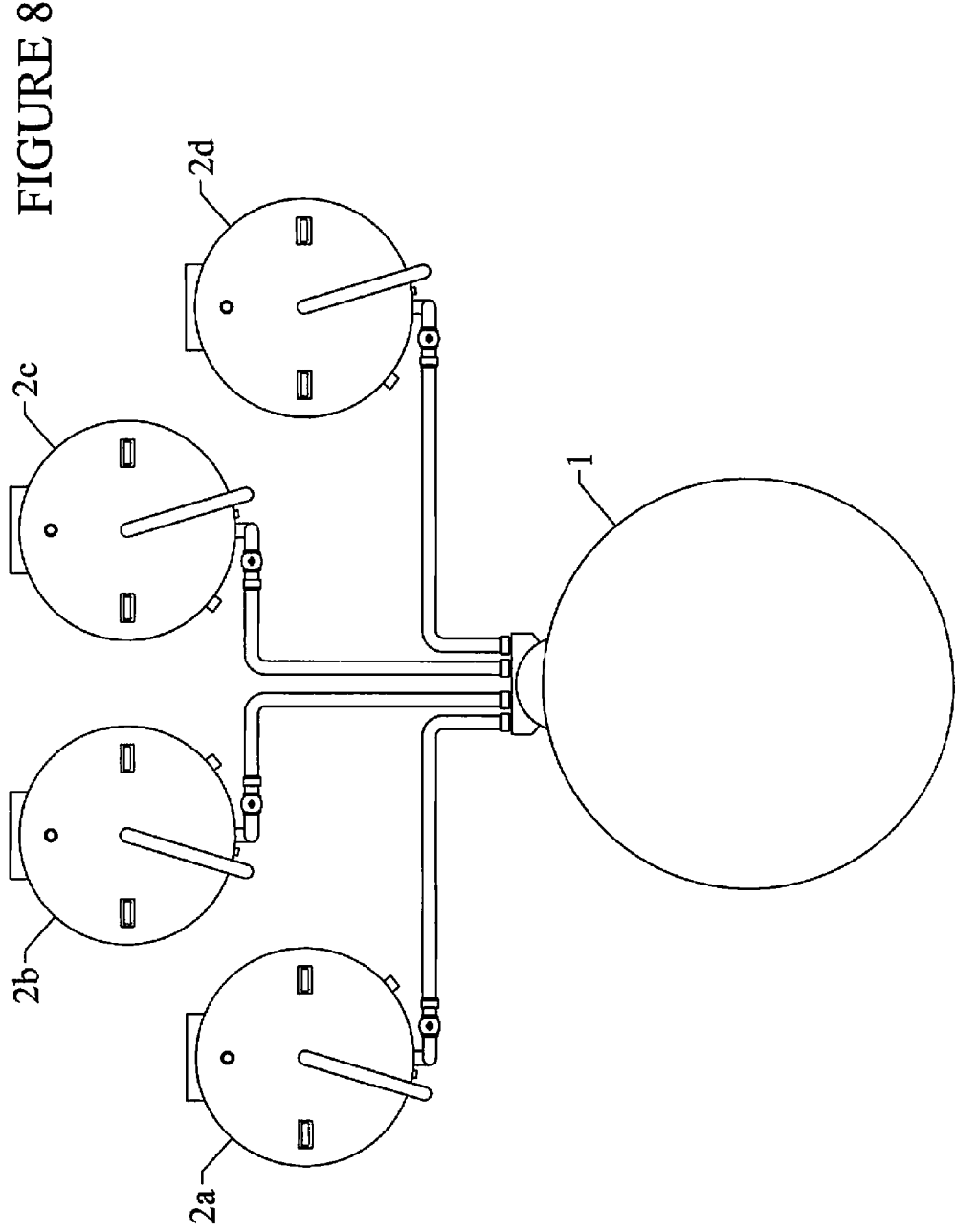

METHOD FOR TREATING GASES TO BE SCRUBBED

CROSS REFERENCE TO RELATED APPLICATIONS

The present application claims priority to U.S. Provisional Application Ser. No. 61/063,901 filed on Feb. 6, 2008, entitled "Gas/liquid contact device" and U.S. Provisional Application Ser. No. 61/065,720 filed on Feb. 14, 2008, entitled "Gas/liquid contact device". These references are incorporated herein.

FIELD

The present embodiments generally relate to method for treat gases to be scrubbed.

BACKGROUND

A need exists for a method for cleaning gases from contaminates with up to about 100 percent efficiency and no less than about 70 percent efficiency.

A further need exists for a method for scrubbing gasses with contaminates like benzene that does not require utilities and does not generate heat.

A further need exists for a method for cleaning gases of contaminates that operates at low pressures and is safer to operate than method that require high pressures.

The present embodiments meet these needs.

BRIEF DESCRIPTION OF THE DRAWINGS

The detailed description will be better understood in conjunction with the accompanying drawings as follows:

FIG. 8 shows four scrubbers connected in parallel according to an embodiment of the invention.

Figure 1:
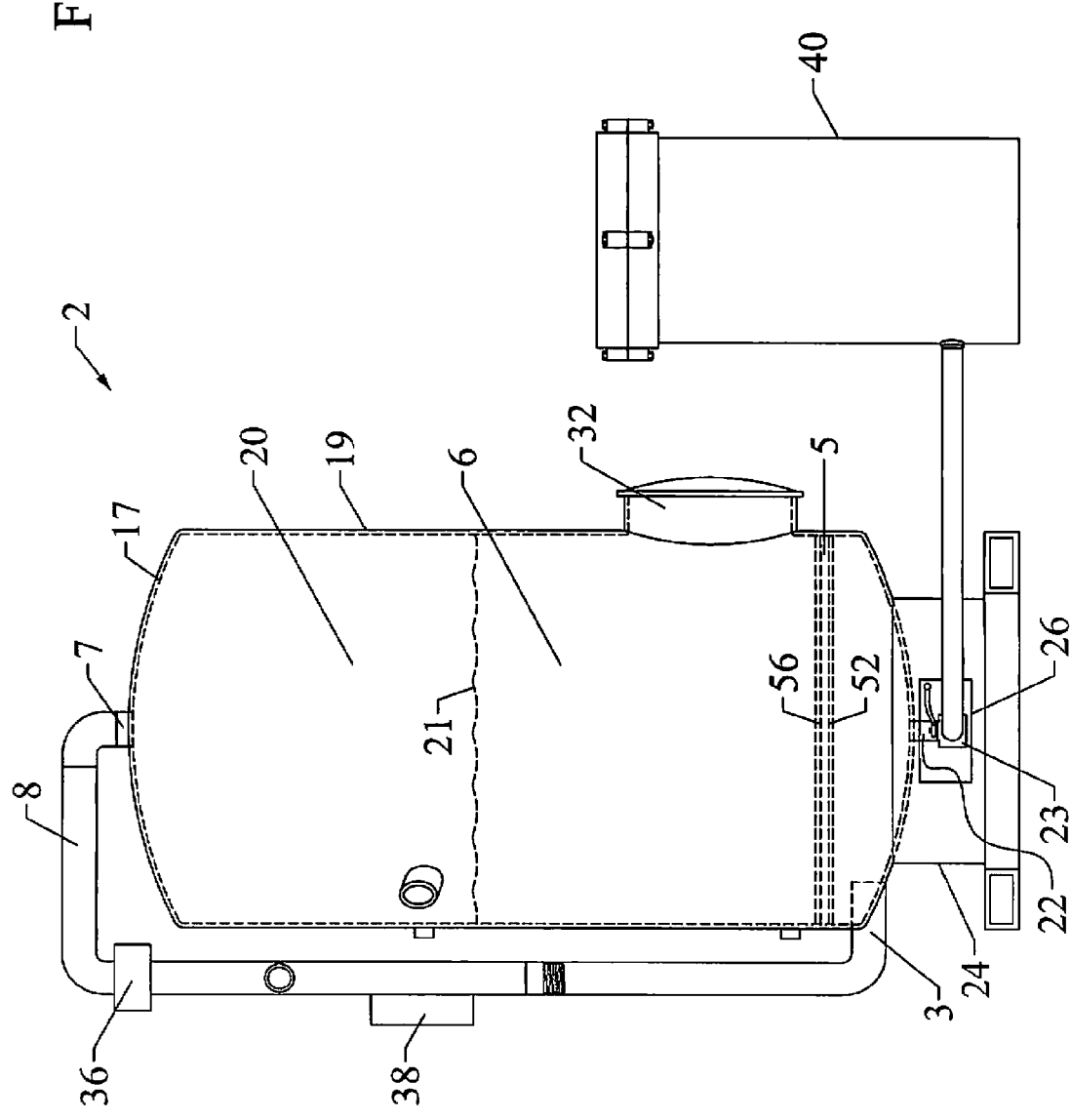
FIG. 1 is schematic drawing of a system for use with the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to method for treat gases to be scrubbed.

The present embodiments relate to a method for treating gases to be scrubbed that involves the steps of filling a scrubber having a reaction chamber with lean liquid that covers a sintered permeable membrane disposed across in the reaction chamber and additionally fills the reaction chamber an additional 20 percent; introducing gases to be scrubbed from a source to the reaction chamber on a first side of the sintered permeable membrane; building up pressure in the reaction chamber forming a reaction zone in the sintered permeable membrane; intermingling gases to be scrubbed with lean liquid in the sintered permeable membrane; forming a reaction zone above the sintered permeable membrane; producing scrubbed gas in the reaction zone; passing scrubbed gas to an exit port at a rate equal to the rate which gases to be scrubbed are treated in the reaction zone while creating a pressure drop of at least 0.2 psi in the reaction chamber wherein the scrubbed gas has an initial drop in contamination concentration of at least about 99 percent gradually decreasing to about 70 percent as additional gases to be scrubbed are introduced to the sintered permeable membrane without replacing the lean liquid.

The scrubber can have a housing. The housing can have up to a 48 inch diameter and a height up to 72 inches, seam to seam. The housing can be made from carbon steel, stainless steel or steel alloys, aluminum, bronze, brass copper, polyethylene, polypropylene, tungsten, PVC, reinforced fiberglass, concrete or combinations of these materials. The housing can have one or more reinforcing ribs on either the inside or outside of the scrubber. The housing is resistant to explosion with pressures up to about 25 psi. It is contemplated that the housing can resist explosion at internal pressures up to about 2500 psi. The housing can further have a wall thickness of about $3/16^{th}$ inch which can further contain a reaction chamber.

The housing can be filled with a lean liquid that can be a methyl ester, a blend of animal fat and vegetable oil, in a ratio of 80:20 blend.

The housing can also contain a sintered permeable membrane, which can be disposed across the interior of the housing forming a reaction chamber in the membrane. The sintered permeable membrane can be about 20 inches above the sintered permeable membrane, or at least 20 percent of the volume of the housing In this example the sintered permeable membrane can be about $1/8^{th}$ inch thick and can be made of a porous plastic material. The sintered permeable membrane can further have pores with sizes of about 50 microns. An example of can be manufactured by GenPore of Reading, Pa.

Gases to be scrubbed can be introduced through an inlet in the housing into the fluid and below the sintered permeable membrane. The gases to be scrubbed can be introduced at about 350 cubic feet per minute (CFM).

As the gases to be scrubbed entered the vessel, a reaction zone can then created in the sintered permeable membrane.

The lean liquid can then be passed through the membrane, as pressure builds up in the reaction chamber, forming a reaction zone of lean liquid against a head pressure for introducing the gases to be cleaned.

The gases to be scrubbed can then be intermingled in the pores of the sintered permeable membrane, removing some contaminates while the gases to be scrubbed were in the pores. Gases can then be flowed from the pores to a reaction zone of lean liquid above the sintered permeable membrane for additional removal of contaminates through migration of the gases through the lean liquid.

The scrubbed gases can then be passed to an exit port at a rate of about 350 CFM which can be identical to the rate of introduction of the gases to be scrubbed.

Pressure can then be dropped in the housing of at least 0.9 psig.

The scrubbed gas resulting from the scrubbing process can have an initial drop in contamination concentration of benzene of about 99.99 percent for at least about 24 hours and this high level of cleaning gradually decreased to about 78 percent over about a 7 day period because the lean liquid was not replaced or recycled.

The continuous cleaning process with one volume of lean liquid can have many advantages, and one of the best advantages is that it can be used in remote areas without utilities.

An embodiment can contemplate a method of replenishing the lean liquid through a recycle step.

Additional embodiment of the invention can contemplate that the lean liquid can be filled in the housing to about 25 percent and up to about 33 percent of the volume of the reaction chamber.

In an embodiment, it can be further contemplated that fluid can rise with the gases into areas of the reaction chamber above the lean liquid. To manage this fluid that escapes the main body of fluid, a dissipation area can be maintained in the reaction chamber above the lean liquid for removing enriched liquid containing the contaminates from the scrubbed gases.

The embodiments can contemplate an additional step, which can include filling the lean liquid into the housing at a rate equivalent to the rate of venting scrubbed gas from the reaction chamber.

The embodiments can also contemplate that the filling of the housing with gases to be scrubbed can create between about 0.5 pounds to about 14 pounds of pressure in the reaction chamber to more effectively remove contaminates from the scrubber. The term "more effectively remove contaminates" can refer to the saturation capacity of the lean liquid, that is, the saturation capacity of the lean liquid goes up, so that the lean liquid effectively and efficiently removes contaminates from the gases to be scrubbed for longer periods of time without having to refill the lean liquid.

In an embodiment, the gases to be scrubbed can be introduced to the reaction chamber at a rate between about 0.1 cubic feet per minute (CFM) to about 20,000 CFM such as using a vacuum pump.

The sintered permeable membrane in an embodiment can be flexible and bendable, and can be shaped. The term "bendable" can refer to an ability to fold the membrane which can be about 48 inches wide to go through a 20 inch manway.

The term "tubular" when associated with the membrane can mean that the membrane can be formed in the shape of a tube, or a cone, and inserted into the housing so that the gases to be scrubbed can be introduced to the center of the tubular, and the membrane forms a reaction zone along with lean liquid pushed through the cone or tubular to the outside of the tubular.

The invention contemplates a system, which is useable with the embodied method for removing unwanted contaminates from gases using a scrubber. A system usable with this method can have a housing with a reaction chamber having a liquid level, an inlet connected to a source containing gases to be scrubbed with a contamination concentration greater than zero ppb to saturation. A gas exit port can be connected to the housing and can be used for evacuating scrubbed gas and a sintered permeable membrane can be disposed across the reaction chamber, which can provide a reaction zone in the plurality of pores when gases to be scrubbed are introduced to the membrane on a first side while the membrane is immersed in the lean liquid; and a cleaned gas on a second side wherein the clean gas initially has a drop in contamination concentration of at least about 99 percent and gradually decreasing to about 70 percent as additional gases to be scrubbed are introduced to the plurality of pores without replacing the lean liquid.

The housing can be mounted on a pedestal horizontally or vertically. The housing can be a ball, a rounded rectangular housing or of other geometric configurations. The pedestal can support the housing, which as described herein can be referred to as "scrubber". The pedestal can have an access port that connects to a drain port in the housing. The pedestal can be a ferrous or non-ferrous material but must be strong enough to support the weight of the housing with other components installed therein. The pedestal can be modular with the housing, that can be removably detachable from the housing, so that both units can be easily truck mounted without the need for special permits when moved on a highway.

In an embodiment, the pedestal can be a mobile trailer, that is, a moveable pedestal as a trailer, but fixed into the trailer construction.

The embodied system usable with the novel method can be usable with a modular transportable system for removing unwanted contaminates from gases. The system can further comprise a movable transport vehicle and a removably modular scrubber disposed on the moveable transport vehicle.

An example of a movable transport vehicle can be a barge, a trailer, a barge with a trailer disposed on the barge, a truck, a ship, a rail car with a trailer disposed thereon.

The embodied method can also be usable with a vacuum truck The vacuum truck can have a bed with at least one vacuum pump, a vacuum pump exhaust and at least one scrubber integrally and non-removably connected to the bed of the vacuum truck. At least one scrubber engages the vacuum pump exhaust, and subsequent scrubbers can be connected in series to the at least one scrubber.

As a benefit, the method does not require hooking up to any plant, municipal or state utilities to operate. The method can be truck mounted, and using pressure and minimal energy, produces "cleaned" or "scrubbed gas" that meets federal codes for clean air. No outside service needs to be planned for, and the scrubber can be used in remote or isolated locations where utilities are not available, such as in the Arctic Circle.

The method can provide tremendous versatilities applied to scrubbers that can be modular or multiple scrubbers that can be hooked up in series or in parallel with varying capacities and abilities to remove different contaminates.

The method works on a scrubber with no moving parts, so the method is more reliable than others causing lower costs because of fewer repairs and literally no down times due to maintenance issues.

The method can result in a reduction in possibility of regulatory fines for users and a reduction in administrative costs resulting from emission events due to equipment failures.

The method can provide an efficiency in removal of contaminates of up to about 100 percent and at least about 70 percent.

The method can contemplate using a volatile compound, which can include, but is not limited to hazardous air pollutants, benzene, toluene, or less volatile compounds such as ethylene, xylenes, hexane, ethanols, MTBE, chlorinated hydrocarbons, aromatic compounds, acid gases and combinations thereof.

The method can further contemplate using a housing that can be double walled or single walled. The housing can be insulated. The housing can be adapted to provide heat tracing results during use.

The housing can include an interior liner. The liner can surround the reaction zone in the housing. The liner can be film, a thermoplastic or composite coating, a phenolic resin coating, an epoxy paint, a rubber or combinations thereof.

Lean liquid can be filled through a liquid fill port in the housing. One lean liquid or blends of two lean liquids can be used for treating the gases added to the reaction zone.

Turning now to the Figures, the method is better understood by understanding the system on which the method can operate.

Turning now to the Figures, FIG. 1 shows the housing 19 on a pedestal 24 having a reaction zone 46 in a reaction chamber 20 and a drain port 22. The drain port can communication between the housing 19 and the drain port 22. The drain port can flow to a collection tank 40.

The drain port 22 can be a sump and a drain tube, or a siphon tube can extend into the drain port to remove any liquid in the reaction zone using a pump. The sump and drain tube embodiment can be particularly useful with the roll off container embodiments of the scrubber when hazardous materials are used.

The drain port 22 can have a drain valve 23, such as a ball valve, a gate valve or a butterfly valve, such as those made by Fisher of Stockham, which can control the flow from the drain port 22 to the collection tank 40.

The reaction chamber 20 can be filled with a lean liquid 6 creating a liquid level 21. During scrubbing the lean liquid 6 can move up and down in the reaction chamber 20 providing variable liquid levels 21 with the lean liquid 6 herein.

The lean liquid can be a liquid adsorbent, a liquid solubilizer, a liquid absorbent, a liquid reacting agent or combinations thereof. Examples of lean liquid can include hydraulic oil such as a 10 weight hydraulic fluid, refined diesel fuel, fatty acids such as tall oil, amine solutions, methyl esters, animal fats, combination of an acid leached bentonite and a modified aminoplast resin and a solid hydrophobic material, tannins, oils from animals such as emu oil, biologically derived fluids including palm oil and plant oils. Liquid reacting agents such as acetic acid, phosphoric acid, caustic solutions of sodium hydroxide, water, caustic solutions of potassium hydroxide can be used. The lean liquid may include surfactants such as detergents, including but not limited to polyethoxylated tallow amine, ethoxylated fatty amines, alkylphenol ethoxylate-based surfactants, alcohol ethoxylate-based surfactants, organosilicones, alcohol ether sulfate, sodium alkyl propoxylated.

The housing 19 can have an inlet 3. The inlet 3 can be connected to a source 1 that contains the gases to be scrubbed 44.

The gases to be scrubbed 44 can have a contamination concentration greater than 0 ppb to saturation, such as in the range of about 20 ppm to about 250 ppm.

The gases to be scrubbed can be gases with contaminates that are organic compounds, hazardous air pollutants, hydrogen sulfides, ammonia, sulfur dioxide and combinations thereof. The amounts to be scrubbed for refineries for certain streams have different percentages than for a chemical plant, and the amounts to be cleaned depend on the location of the plant having the gases to be scrubbed.

For example, in Corpus Christi, Tex., a gas to be scrubbed can be a stream of gas with more than about 5 ppm benzene as of Jan. 29, 2009.

The gases to be scrubbed can be anticipated to be gases that exceed federal Environmental Protection Agency "EPA", Title 40 regulations as of Jan. 1, 2009 and Texas Commission on Environmental Quality, Title 30 regulations regulatory levels as of Jan. 1, 2009.

Turning now to the Figures, FIG. 1 shows a scrubber 2 with a housing 19 on a pedestal 24. Inside the housing 19 can be a reaction chamber 20 with a drain port 22. The drain port can flow to a collection tank 40.

The drain port 22 can be a sump and a drain tube, or a siphon tube can extend into the drain port to remove any liquid in the reaction zone using a pump. The sump and drain tube embodiment can be particularly useful with roll off container embodiments of the scrubber when hazardous materials are used.

The drain port 22 can have a drain valve 23, such as a ball valve, a gate valve or a butterfly valve, such as those made by Fisher of Stockham, which can control the flow from the drain port 22 to the collection tank 40.

In an embodiment, the pedestal 24, for supporting the scrubber 2, can have a pedestal access port 26, which can be a square cut entry or rectangular cut entry between about 6 inches by about 8 inches to about 12 inches by about 24 inches for allowing individuals or operators access to the drain valve 23.

Also shown in FIG. 1 is a manway 32 in the housing for providing access to the inside of the housing to clean an maintain the reaction chamber or to replace the sintered permeable membrane. The manway, in an embodiment can be a locking entry with a diameter of about 20 inches.

The reaction chamber 20 can also have a gas exit port 7. The gas exit port can be between about 3 inches to about 24 inches in diameter and can be used to evacuate scrubbed gas 12 (shown in FIG. 6) that has been processed with this scrubber.

In an embodiment, the gas exit port can be contemplated to have the identical diameter to the inlet.

In still another embodiment, the gas exit port can have a diameter at least equal to the inlet.

An exit conduit 8, can be connected to the exit conduit 7 for allowing the scrubbed gas to vent to the atmosphere or to another container.

Figure 6:
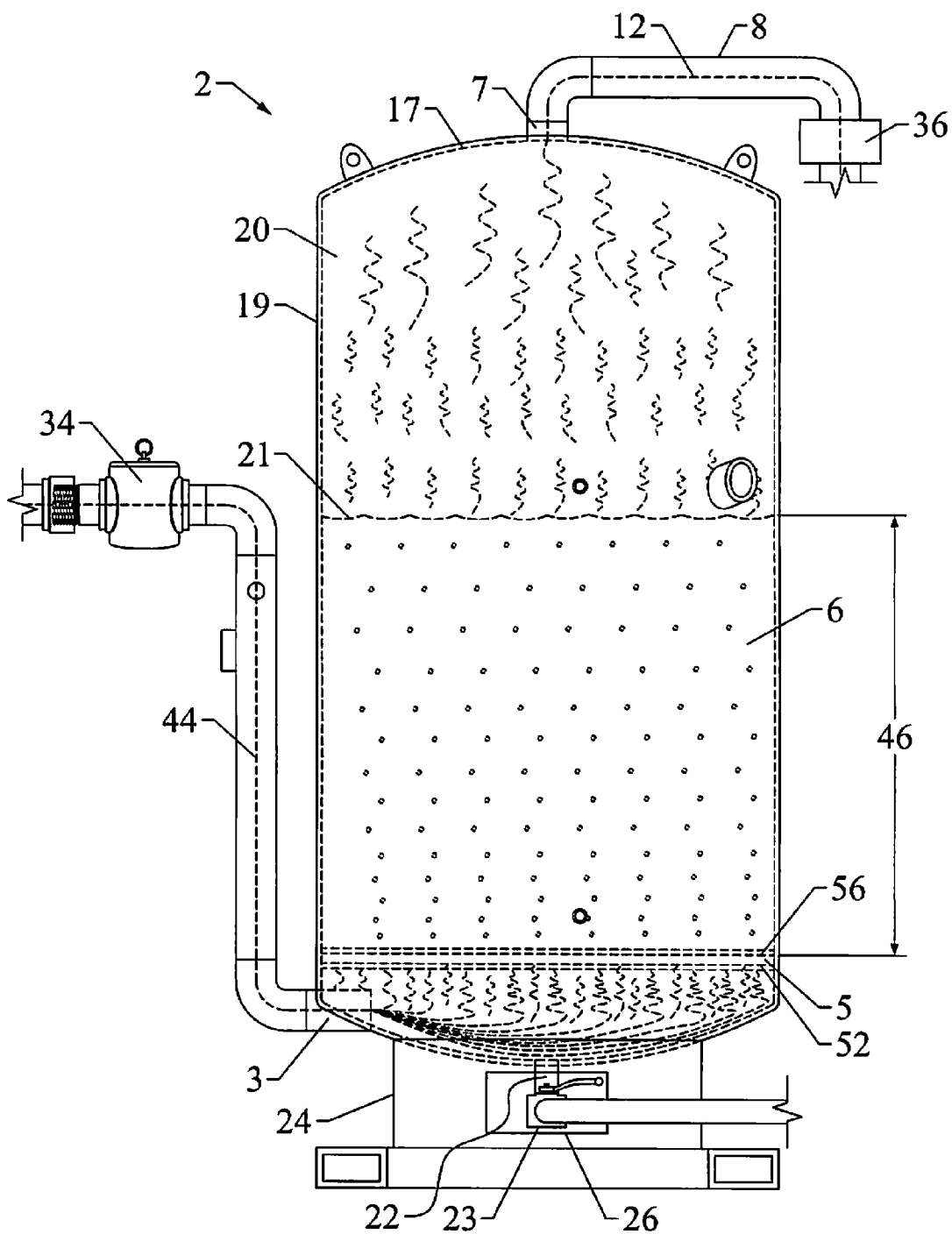
FIG. 6 shows the method after gases to be scrubbed have been introduced to the system.

A knock out canister 36, such as those custom made by Proco of Kingsville, Tex., can serve to knock out, remove, or capture any of the liquid that can be entrained in the scrubbed gas 12 (shown in FIG. 6). The knock out canister can be located between a vent 38 and the exit conduit 8.

The reaction chamber 20 can be filled with a lean liquid 6 creating a liquid level 21. During scrubbing the lean liquid 6 can move up and down in the reaction chamber 20 providing variable liquid levels 21 with the lean liquid 6 herein.

The lean liquid can be a liquid adsorbent, a liquid solubilizer, a liquid absorbent, a liquid reacting agent or combinations thereof. Examples of lean liquid can include hydraulic oil such as a 10 weight hydraulic fluid, refined diesel fuel, fatty acids such as tall oil, amine solutions, methyl esters, animal fats, combination of an acid leached bentonite and a modified aminoplast resign and a solid hydrophobic material, tannins, oils from animals such as emu oil, biologically derived fluids including palm oil, plant oils. Liquid reacting agents such as acetic acid, phosphoric acid, caustic solutions of sodium hydroxide, water, caustic solutions of potassium hydroxide can be used. The lean liquid may include surfactants such as detergents including, but not limited to polyethoxylated tallow amine, ethoxylated fatty amines, alkylphenol ethoxylate-based surfactants, alcohol ethoxylate-based surfactants, organosilicones, alcohol ether sulfate, sodium alkyl propoxylated.

The housing can include an interior liner 17. The liner can line the inside of the entire housing. The liner can be film, a thermoplastic or composite coating, a phenolic resin coating, an epoxy paint, a rubber or combinations thereof.

The housing 19 can also have an inlet 3. The inlet 3 can be connected to a source 1 (shown in FIG. 2) that contains the gases to be scrubbed 44.

The inlet 3 can be below the liquid level 21 in the reaction chamber.

The inlet 3 can be about a 3 inch to about 24 inch diameter inlet with flow rates that can range from about 1 cubic feet per minute to about 20000 cubic feet per minute.

In an embodiment it can be contemplated that the inlet 3 can be positioned in the housing to insure that the gases to be scrubbed are introduced to the lean liquid initially.

FIG. 1 also shows a sintered permeable membrane 5, with a first side 52 and a second side 56, which can be disposed across the reaction chamber 20, extending from wall to wall of the housing 19 (with or without liner 17). The sintered permeable membrane 5 is also shown in FIG. 2 and FIGS. 5-7.

Figure 2:
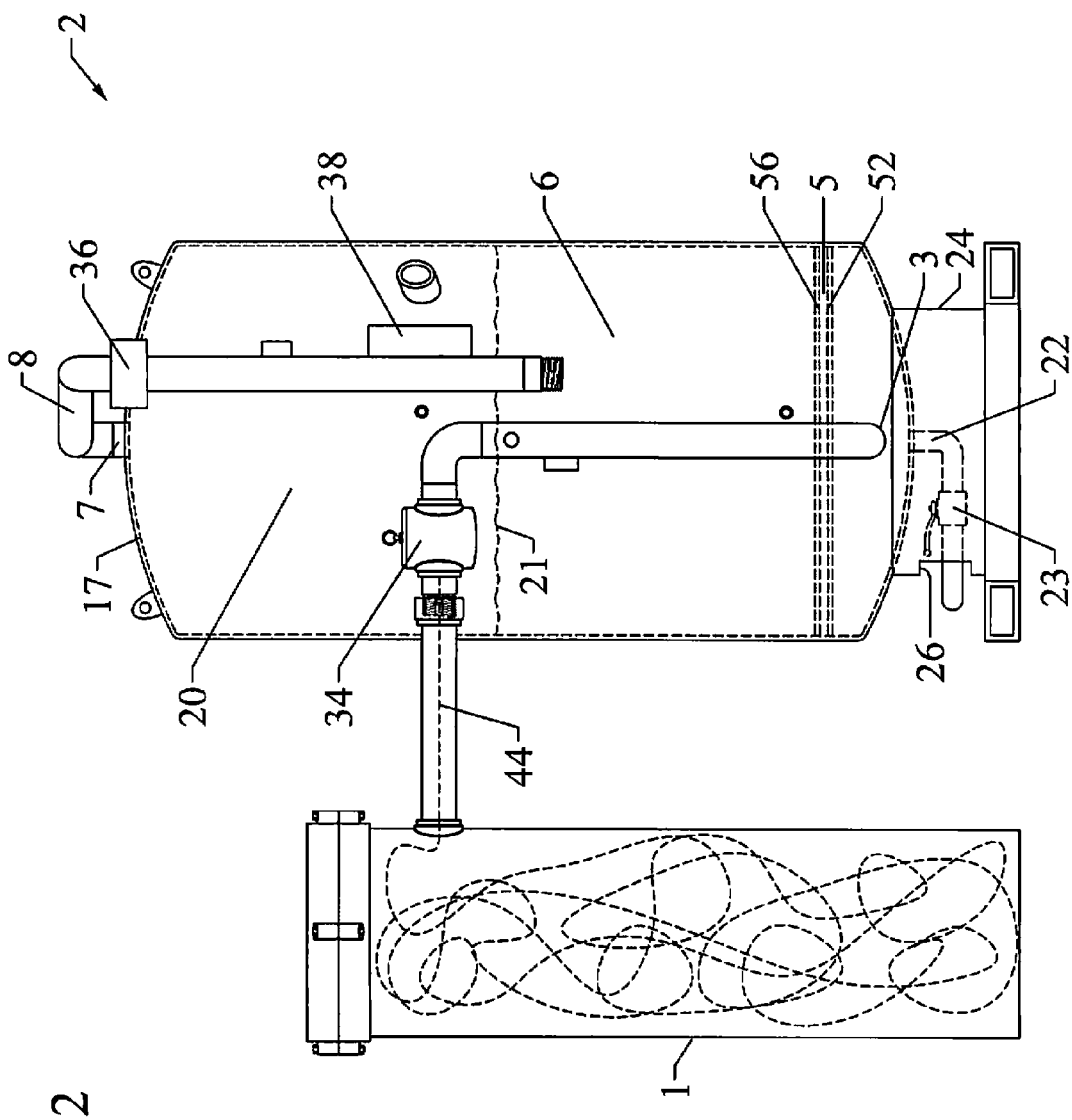
FIG. 2 is an alternative view of a system for use with the method.

FIG. 2 depicts an alternate embodiment of the scrubber 2 connected to a source 1 of gases to be scrubbed 44.

In FIG. 2, an inlet check valve is shown positioned between a source 1 of gases to be scrubbed 44 and the inlet 3 of the scrubber 2. The inlet check valve 34 can be used to control the flow of gases to be scrubbed 44 through the inlet 3. The valve can be a low pressure, such as between about 1 psi to about 100 psi. The valve can be a swinging check valve. A feature of the embodiments is that the inlet pressure can be low, making this scrubber safer than high pressure scrubbers.

Figure 3:
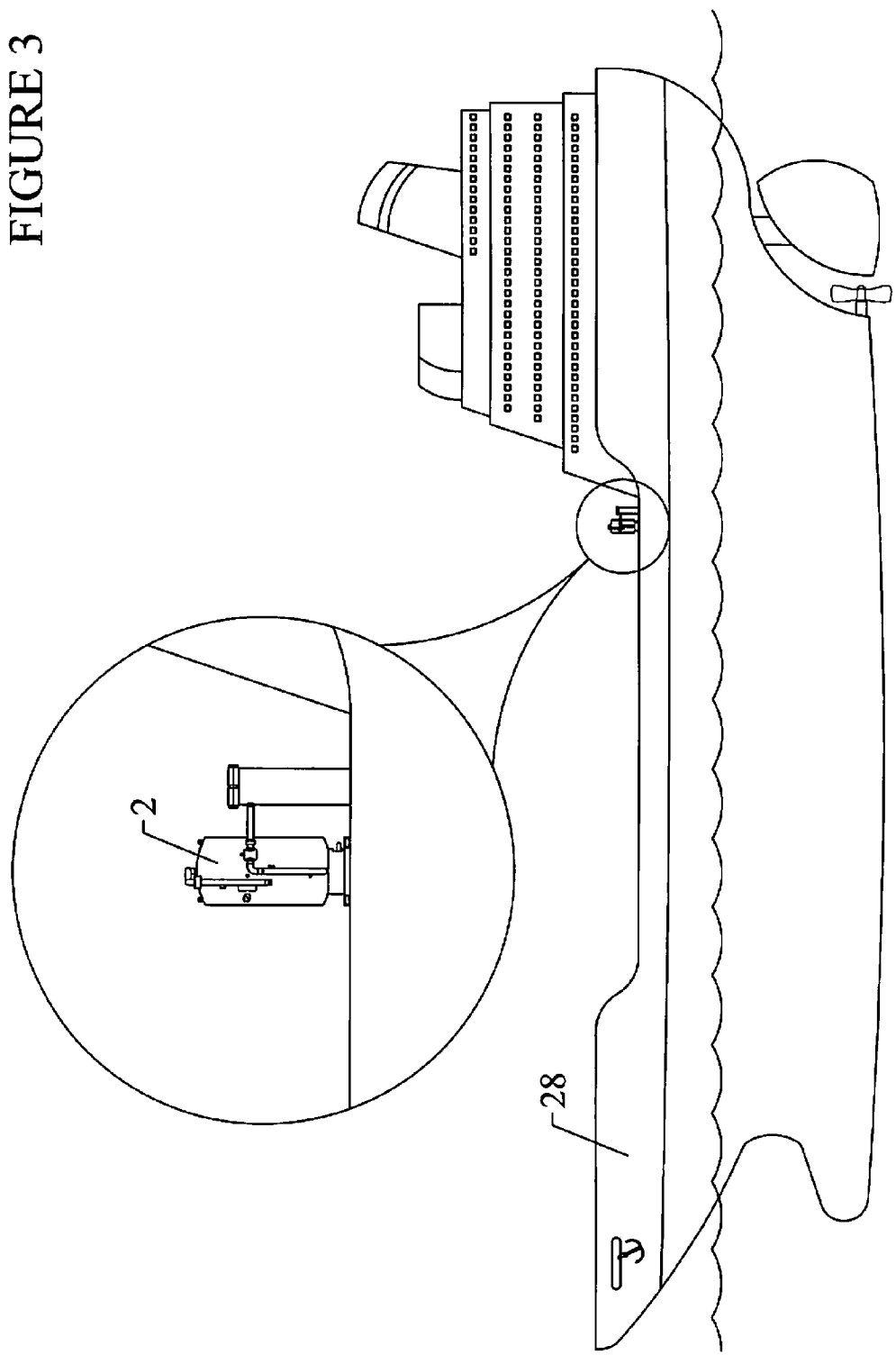
FIG. 3 is an embodiment that shows how the method can be used on a ship.

FIG. 3 shows an embodiment of the invention on a moveable transport vehicle 28 that in this version is a barge.

Figure 4:
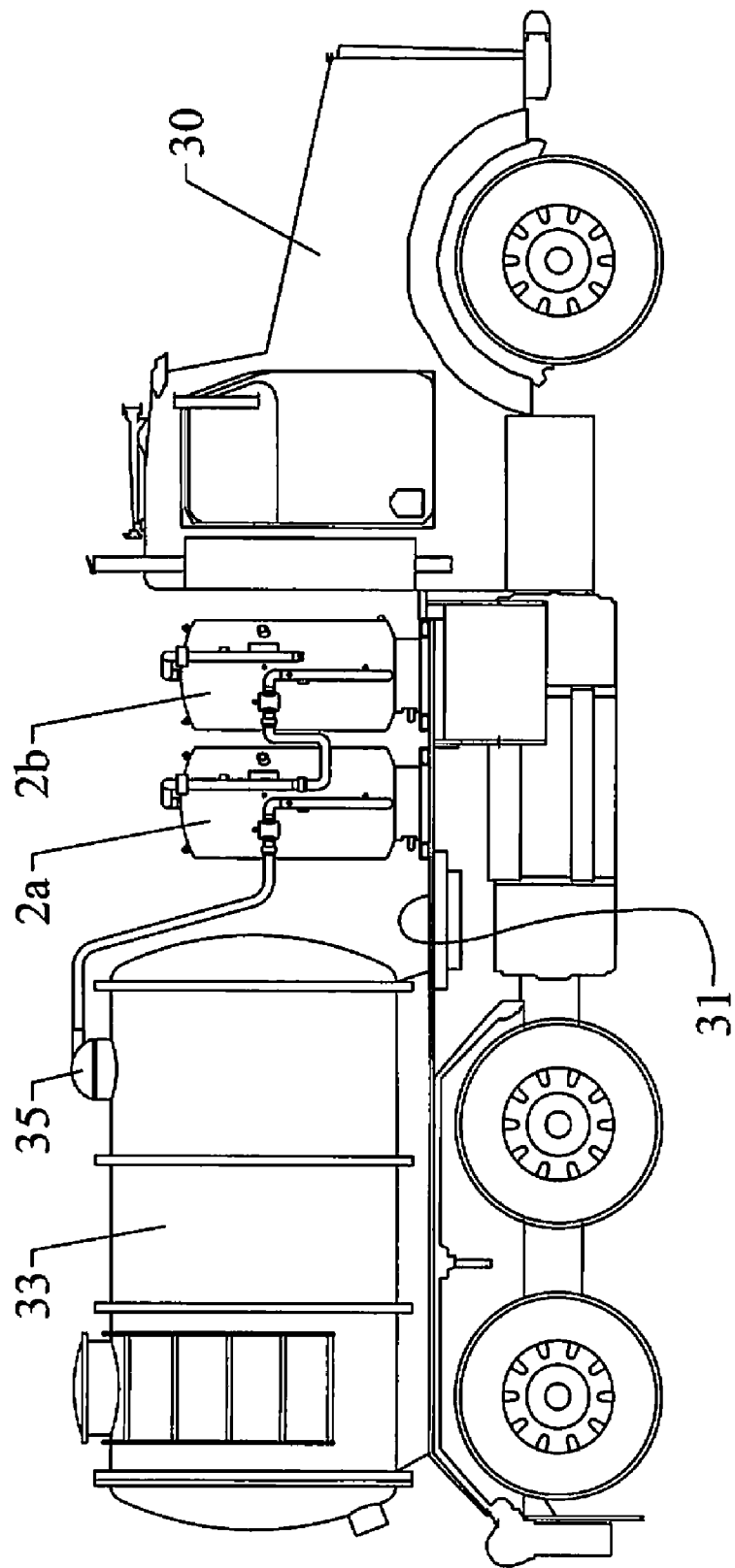
FIG. 4 is an embodiment that depicts that the method can be used on a vacuum truck.

FIG. 4 shows an embodiment of a plurality of scrubbers connected in series on a transport vehicle, which is depicted as a truck 30 in this embodiment. This embodiment shows that a first scrubber 2a can connect to a second scrubber 2b and additional scrubbers can be added to provide versatility in capacity of scrubbing gases, such as during a start up from a turn around at a chemical plant, when excess capability might be needed for a short time, but not for a long term solution. The modularity of the scrubbers, the ability to mix and match scrubber sizes to a need of a user provides a unique advantage to this invention. Additionally, if a gas stream needs to be "multiprocessed" that is treated to the same lean liquid repeatedly, the scrubbers connected in series enable this operation style.

FIG. 4 further shows a truck 30 with a bed 31, a vacuum pump on the vacuum check with a vacuum pump exhaust 35. The scrubbers 2a, 2b are connected to the vacuum pump exhaust 35.

In the embodiment of FIG. 4, it can be contemplated that the scrubbers can be removably connected to the truck bed, that is creating a modular transportable system using modular scrubbers. Another embodiment can contemplates welding the scrubbers to the truck, creating an immovable scrubber on the bed, while the truck is moveable.

Figure 5:
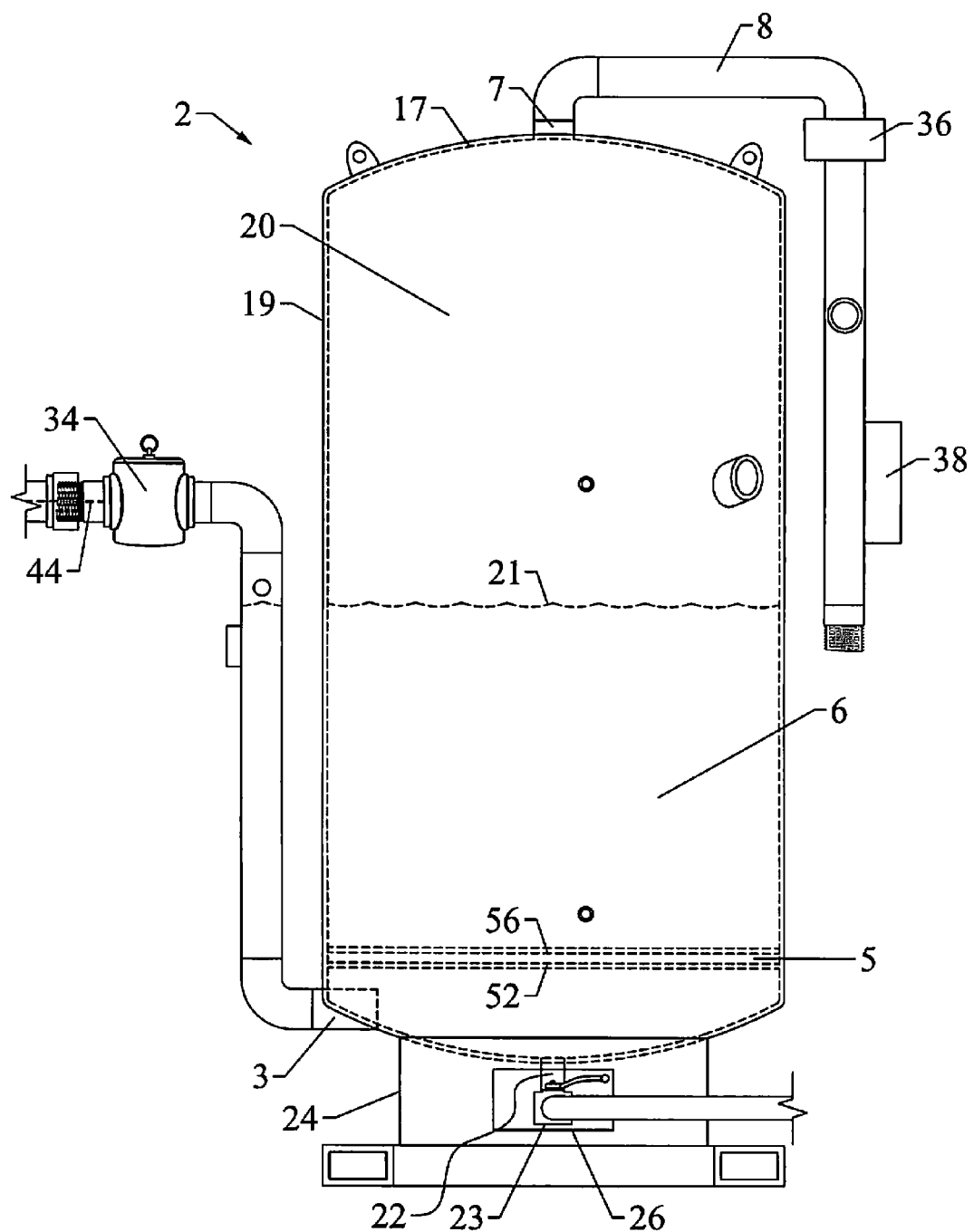
FIG. 5 depicts the method prior to the introduction of gases to be scrubbed to the scrubber.

FIG. 5, shows scrubber 2 with lean fluid 6 prior to introducing gases to be scrubbed 44 through the inlet 3. Lean fluid 6 is shown filling the reaction chamber 20 on both the first side 52 and second side 56 of the sintered permeable membrane 5.

FIG. 6 depicts the scrubber 2 with lean fluid 6 having moved through the sintered permeable membrane 5. Gases to be scrubbed 44 are shown flowing from the inlet 3 into the chamber 20. The gases to be scrubbed can then pass through the sintered permeable membrane 5 forming the reaction zone 46.

The gases to be scrubbed 44 can have a contamination concentration greater than 0 ppb to saturation, such as in the range of about 20 ppm to about 250 ppm.

The gases to be scrubbed can be gases with contaminates that are volatile organic compounds, hazardous air pollutants, hydrogen sulfides, ammonia, sulfur dioxide and combinations thereof. The amounts to be scrubbed for refineries for certain streams have different percentages than for a chemical plant, and the amounts to be cleaned depend on the location of the plant having the gases to be scrubbed.

For example, in Corpus Christi, Tex., a gas to be scrubbed can be a stream of gas with more than about 5 ppm benzene as of Jan. 29, 2009.

The gases to be scrubbed can be anticipated to be gases that exceed federal

Environmental Protection Agency "EPA", Title 40 regulations as of Jan. 1, 2009 and Texas Commission on Environmental Quality, Title 30 regulations regulatory levels as of Jan. 1, 2009.

The sintered permeable membrane can provide a reaction zone 46 wherein the gases to be scrubbed 44 can be introduced from the inlet 3 to a first side 52 of the membrane. At the start of the process, the sintered permeable membrane can be immersed in the lean liquid and all the pores can then be filled with the lean liquid (as seen in FIG. 5).

Initially the lean liquid can act as a valve, to control the exit of cleaned gases, enabling pressure to build up in the housing without the need for an additional exit valve, which enables the scrubber to uniquely behave more reliably.

As gases to be scrubbed increase the pressure beneath the sintered permeable membrane 5, the lean fluid 6 can begin to move through the pores with the gases, scrubbing the gases due to the tremendously increased surface area of the pores.

As scrubbing occurs, a "head pressure" can be created and the lean fluid 6 can move into the reaction zone 46 above the sintered permeable membrane 5, the gas to be scrubbed 44 can then be introduced below the sintered permeable membrane 5, in the reaction chamber 20. The gases to be scrubbed can then move through the sintered permeable membrane 5 into the reaction zone 46.

Cleaned gases, which are identified herein as scrubbed gas 12, can flow past a second side 56 of the membrane. The scrubbed gas has a drop in contamination concentration of at least about 99 percent and gradually decreases to about 70 percent as additional gases to be scrubbed are introduced to the housing through the inlet without refilling or replacing the lean liquid.

Scrubbed gas, as the term is used herein refers to gas which has not only passed through the scrubber, but targeted contaminates have been removed and the resulting scrubbed gas meets or exceed EPA or state standards for "clean air" including but not limited to Title 40 for the EPA and the Texas Administrative Code Title 30, Chapter 106 subpart k, part 263 as well as Chapter 115, subpart d, divisional 1, and Chapters 311-319, which state no more than 20 ppm or 90 percent "removal efficiency" that is 90 percent of the contaminates provide "clean air". Other regulations provide a higher contamination concentration as their definition of "clean air."

In an embodiment, it can be contemplated that the contamination concentration can be between about 562,000 ppm and about 100 ppm for the gases to be scrubbed.

The scrubbed gas 12 can exit the reaction chamber 20 through the exit port 7 into the exit conduit 8.

The knock out canister 36 can serve to knock out, remove, or capture any of the liquid that can be entrained in the scrubbed gas 12. The knock out canister can be located between a vent 38 (shown in FIG. 1) and the exit conduit 8.

Figure 7:
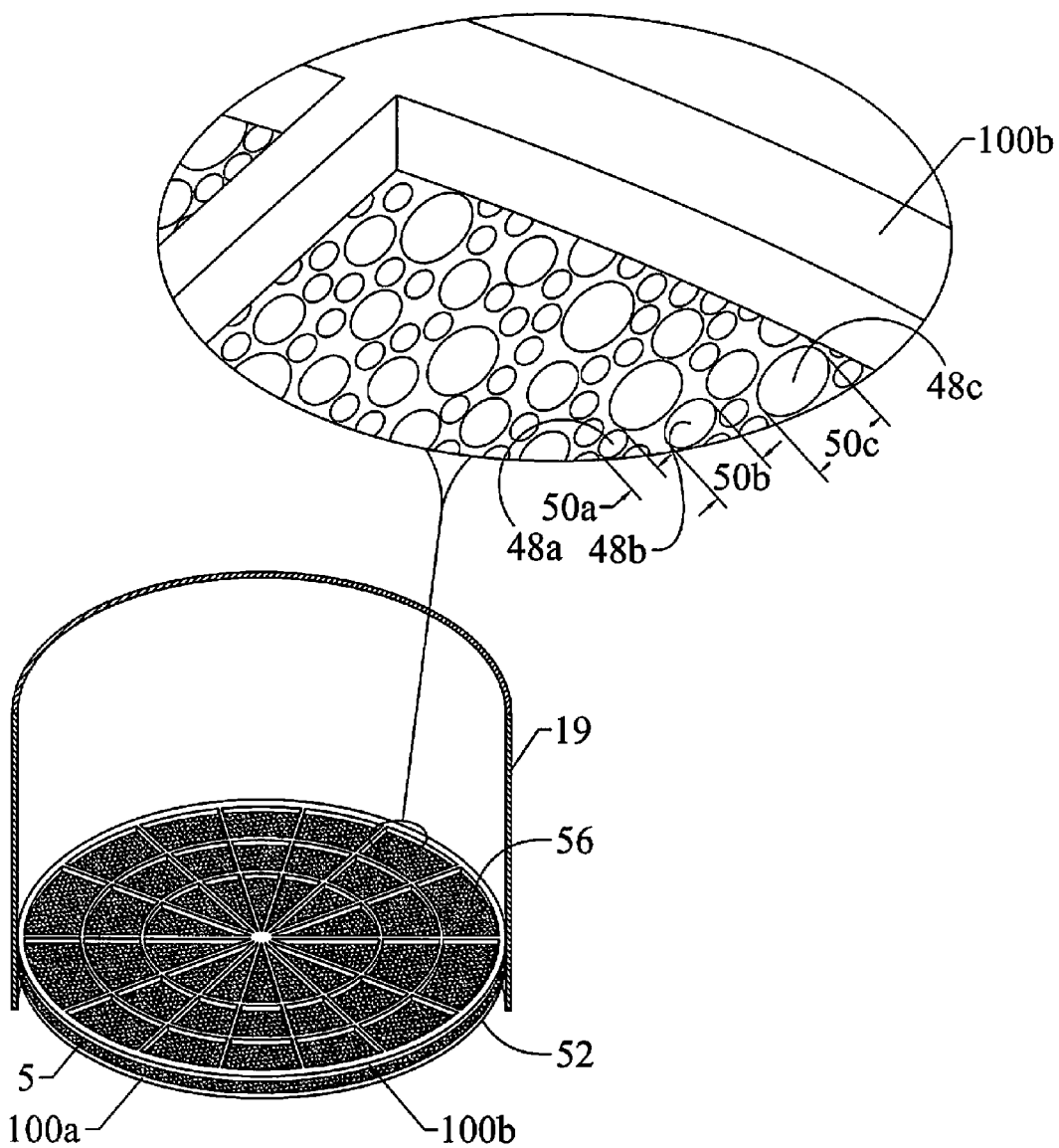
FIG. 7 is a cut view of a housing showing the sintered permeable membrane usable with the method.

FIG. 7, depicts a partial cut view of the housing 19, without a liner 17, revealing the sintered permeable membrane 5.

The sintered permeable membrane, as shown in FIG. 7, can have pores of identical diameters, such as all being about 50 micron diameters. The pore are depicted as elements 48a, 48*b*, and 48*c* and the pore diameters can be identified as elements 50*a*, 50*b*, and 50*c* in FIG. 7. However, the pores can range in diameter between about 1 micron to about 10,000 microns.

The sintered material of the sintered permeable membrane can have void spaces equivalent to between about 40 percent to about 50 percent of the sintered permeable membrane, that is the material making up the membrane can have open spaces that are between about 40 percent to about 50 percent. The sintered material of the sintered permeable membrane can have both internal pores and external pores.

In an embodiment, the void spaces can be greater then 50 percent or less then 40 percent depending upon the sintered material used. For example, if the sintered material used is carbon aerogel, it can have a void fraction of about >680 percent.

The sintered permeable membrane can be between about 1/32 inch thick to about 24 inches thick The sintered permeable membrane can be held in place inside the reaction chamber 20 by pad grids 100*a* and 100*b*.

The sintered permeable membrane can comprise a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials.

FIG. 8 shows that the scrubbers can be connected in parallel so that several streams can be treated simultaneously on a truck 30. That is, a large gas stream can be split into two streams that go to two scrubbers in parallel on a truck or trailer 2*a,b,c*, and 2*d*. Between about 2 scrubbers to about 12 scrubbers can be used in this embodiment. Additional scrubbers can be used for this purpose, which can be particularly advantageous in the event of a natural disaster, such as a hurricane, when a plant has gone down due to damage, and needs to be brought back up, but for safety considerations, the streams preventively are run through the scrubbers to insure there are no additional problems, as sensors may have been damaged by the hurricane and accurate detection might be difficult.

While these embodiments have been described with emphasis on the embodiments, it should be understood that within the scope of the appended claims, the embodiments might be practiced other than as specifically described herein.

What is claimed is:

1. A method for treating gases to be scrubbed, comprising:
   a. filling a scrubber having a reaction chamber with lean liquid that covers a sintered permeable membrane disposed across in the reaction chamber and additionally fills the reaction chamber an additional 20 percent;
   b. introducing gases to be scrubbed from a source to the reaction chamber on a first side of the sintered permeable membrane;
   c. building up pressure in the reaction chamber forming a reaction zone in the sintered permeable membrane;
   d. intermingling gases to be scrubbed with lean liquid in the sintered permeable membrane;
   e. forming a reaction zone above the sintered permeable membrane;
   f. producing scrubbed gas in the reaction zone; and
   g. passing scrubbed gas to an exit port at a rate equal to the rate which gases to be scrubbed are treated in the reaction zone while creating a pressure drop of at least 0.2 psi in the reaction chamber wherein the scrubbed gas has an initial drop in contamination concentration of at least 99 percent gradually decreasing to 70 percent as additional gases to be scrubbed are introduced to the sintered permeable membrane without replacing the lean liquid.

2. The method of claim 1, wherein the reaction chamber is filled with lean liquid at least 25 percent of the volume of the reaction chamber.

3. The method of claim 1, wherein the reaction chamber is filled with lean liquid at least 33 percent of the volume of the reaction chamber.

4. The method of claim 1, further comprising maintaining a dissipation area of the reaction chamber removing enriched liquid from the scrubbed gas.

5. The method of claim 1, wherein the filling of the housing with gases to be scrubbed creates between 0.5 pounds to 14 pounds of pressure in the reaction chamber enhancing the efficiency of the removal of contaminates from the gases to be scrubbed.

6. The method of claim 1, wherein the gases to be scrubbed are introduced to the reaction chamber at a rate between 0.1 cubic feet per minute (CFM) to 20,000 CFM.

7. The method of claim 1, wherein the sintered permeable membrane is flexible and bendable.

8. The method of claim 1, wherein the sintered permeable membrane is tubular.

* * * * *